G. MOODY.
Stove Grate.
No. 89,880. Patented May 11, 1869.
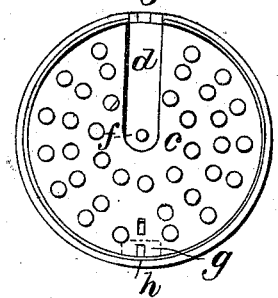
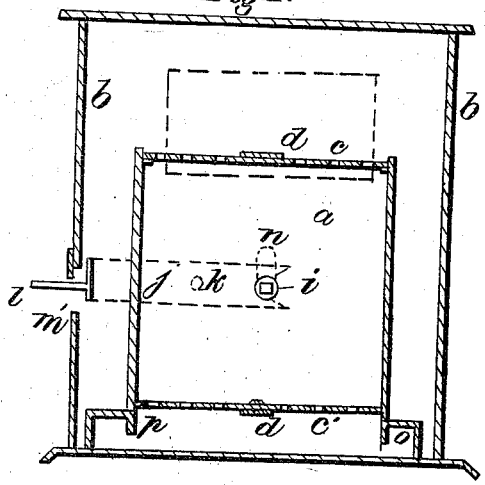
Witnesses
Henry C. Houston
Wm Franklin Leavey
Inventor
Glendy Moody
Per Wm H Clifford atty

United States Patent Office.

GLENDY MOODY, OF FALMOUTH, MAINE.

Letters Patent No. 89,880, dated May 11, 1869.

REVOLVING GRATE IN HEATING-STOVES.

The Schedule referred to in these Letters Patent and making part of the same.

*To all whom it may concern:*

Be it known that I, GLENDY MOODY, of Falmouth, in the county of Cumberland, and State of Maine, have invented a new and useful Improved Stove; and I hereby declare the following to be a full, clear, and exact description thereof, which will enable others to make and use my invention, reference being had to the accompanying drawings, forming part of this specification, in which—

Figure 1 is a sectional elevation of my improvement, showing the fire-chamber, lever, and semi-collar.

Figure 2 is a top plan of one of the grates, showing the hinge and the slide-catch.

My invention relates to an arrangement of grates for a stove or other fire-place, by which the fire-chamber is rendered reversible. I construct the fire-chamber of a cylindrical form, (or any other form may be employed,) and suspend the said chamber in a semi-collar, by pivots, attached to the chamber, passing through holes in the collar, and then into the walls of the stove, or the ends of the collar may be slotted. The chamber-pivots that enter the stove-wall, or outer circumference, rest in elongated slots. The bottom of the fire-chamber rests on a table, which is open at the centre, or under the said chamber. The semi-collar has attached to it an arm, or lever, which projects through the stove-wall to the outside, and is capable of moving up and down in an elongated slot. This lever raises the semi-collar, and with it the chamber, so as to lift the said chamber from the table, and thus allow it to revolve. The collar is pivoted to the stove-walls between the lever just alluded to and the pivots of the fire-chamber, so that by pressing downward the end of the collar toward the lever, which is done by pressing downward on the lever, the other end of the collar is elevated, and thus with it the fire-chamber. The walls of this chamber are solid. It has two grates, one at each end. These grates are hinged, so that they can be raised and lowered by hinges attached to the edge of the chamber. These hinges are long, and reach to the centre of the grates, and are so pivoted as to allow a circular motion in horizontal planes, for the purpose of shaking out the residuum of the fuel after being burned. They are fastened and prevented from opening by a slide-catch or other convenient device. The unhinged side of the grates rests on a small shelf or flange.

The revolution or reversing of the chamber is effected by the pivot of the same projecting through the wall of the stove, and having a square end, to which a handle or removable crank with a square hole is applied.

*a* shows the fire-chamber.
*b*, the outer stove-walls.
*c c'*, the grates.
*d*, the hinges.
*f*, the pivots of said hinges.
*g*, the shelves or flanges.
*h*, the catch, to fasten the grates.
*i*, the pivot of the chamber.
*j*, the semi-collar.
*k*, its pivots.
*l*, the lever.
*m*, its elongated slot.
*n*, the elongated slot of the chamber-pivot.
*o*, the table.
*p*, the hole in the same.

The chamber may be placed in a stove, as illustrated.

The operation of my invention may be described thus:

When it is desired to kindle a fire, first put into the fire-chamber a quantity of coal, the lower grate being already secured in its place, on the top of which put the kindling-matter, charcoal or wood, and on the top of this put shavings or other light combustible matter, apply the fire, and secure the grate in its proper position; then, by means of the semi-collar and lever, raise the fire-chamber from its table, apply the crank or brake to the square end of the pivot by which the fire-chamber is suspended, reverse the fire-chamber, and rest it again upon its table, unfasten the grate which is now on top, turn it off into the back part of the stove, and allow the fire to burn as in ordinary stoves.

When the fire needs replenishing, sift out the ashes by shaking the lower grate, as in ordinary stoves, and supply fresh coal. After the fresh coal is partially ignited, turn the top grate over the fire-chamber, fasten it, and reverse the fire-chamber as before, always turning the grate at the top off into the back of the stove. The result is that the fresh coal is at the bottom, and the gas which is emitted from it is obliged to pass up through the thoroughly-ignited coal, being thereby entirely consumed. The draught is also perfect, from the reason that it is not checked by fine coal and non-combustible matter settling upon the lower grate, these being upon the top of the fire, from which the worthless substances, such as "clinkers," shale, &c., may be easily removed.

Some of the advantages of this arrangement are these:

The necessity of ever sifting coal is entirely obviated; all of the coal is consumed, the grates being so formed as to allow none to pass through; the gases are more completely consumed, thereby rendering the air of the room more pure; and a fresh fire may be had at any time without removing the old material.

As represented in the drawing, the door of the stove, or outer envelope, opens directly on to the top of the fire-chamber.

I do not claim revolving grates; but

What I do claim, and desire to secure by Letters Patent, is—

The improved stove made and to be operated as herein described, and having the devices herein shown, all as set forth.

GLENDY MOODY.

Witnesses:
G. H. CHADWICK,
HENRY C. HOUSTON.